US010474685B1

(12) United States Patent
Gomes et al.

(10) Patent No.: US 10,474,685 B1
(45) Date of Patent: Nov. 12, 2019

(54) MOBILE TO NON-MOBILE DOCUMENT CORRELATION

(71) Applicant: Google LLC, Mountain View, CA (US)

(72) Inventors: Benedict A. Gomes, Mountain View, CA (US); Masanori Harada, Kanagawa (JP)

(73) Assignee: Google LLC, Mountain View, CA (US)

(*) Notice: Subject to any disclaimer, the term of this patent is extended or adjusted under 35 U.S.C. 154(b) by 934 days.

(21) Appl. No.: 14/621,613

(22) Filed: Feb. 13, 2015

Related U.S. Application Data

(63) Continuation of application No. 11/153,237, filed on Jun. 15, 2005, now Pat. No. 8,996,514.

(51) Int. Cl.
*G06F 16/24* (2019.01)
*G06F 16/2457* (2019.01)
*G06F 16/951* (2019.01)

(52) U.S. Cl.
CPC ...... *G06F 16/24578* (2019.01); *G06F 16/951* (2019.01)

(58) Field of Classification Search
CPC ................................................ G06F 16/24578
USPC ........ 707/706, 713, 722–728, 731–732, 735, 707/736, 758, 781, 999.002–6
See application file for complete search history.

(56) References Cited

U.S. PATENT DOCUMENTS

| | | | |
|---|---|---|---|
| 5,598,557 A | 1/1997 | Doner et al. | |
| 5,724,571 A | 3/1998 | Woods | |
| 5,855,015 A | 12/1998 | Shoham | |
| 5,920,859 A | 7/1999 | Li | |
| 5,983,216 A | 11/1999 | Kirsch et al. | |
| 6,560,600 B1 | 5/2003 | Broder | |
| 6,654,742 B1 | 11/2003 | Kobayashi et al. | |
| 6,711,568 B1 | 3/2004 | Bharat et al. | |
| 6,754,873 B1 | 6/2004 | Law et al. | |
| 6,799,176 B1 | 9/2004 | Page | |
| 6,816,850 B2 | 11/2004 | Culliss | |
| 6,871,202 B2 | 3/2005 | Broder | |
| 6,925,595 B1 | 8/2005 | Whiteledge et al. | |
| 2002/0073235 A1 | 6/2002 | Chen et al. | |
| 2002/0168117 A1 | 11/2002 | Lee et al. | |
| 2004/0088646 A1* | 5/2004 | Yeager | H04L 29/06 715/229 |
| 2005/0021675 A1 | 1/2005 | Jokinen et al. | |
| 2005/0065909 A1* | 3/2005 | Musgrove | G06Q 30/02 |

(Continued)

OTHER PUBLICATIONS

"Mobile Search Engines White Paper", available at http://www.medialab.sonera.f:/workspace/MobileSearchEnginesWhitePaperpdf, dated Nov. 15, 2002, 12 pages.

(Continued)

*Primary Examiner* — Syling Yen
(74) *Attorney, Agent, or Firm* — Fish & Richardson P.C.

(57) ABSTRACT

A computer-implemented method of determining the relevance, to a user, of documents accessible over a computer network involves analyzing information relating to a first document, identifying a second document corresponding to the first document using a computer, obtaining information that indicates the relevance of a second document, determining the relevance of the first document using the information indicating relevance of the second document. The first document may be a mobile document, while the second may be a non-mobile document.

23 Claims, 4 Drawing Sheets

(56) References Cited

U.S. PATENT DOCUMENTS

| | | | |
|---|---|---|---|
| 2005/0108322 A1 | 5/2005 | Kline et al. | |
| 2005/0197894 A1 | 9/2005 | Fairbanks et al. | |
| 2006/0190616 A1 | 8/2006 | Mayerhofer et al. | |
| 2007/0094351 A1 | 4/2007 | Kalish et al. | |
| 2011/0055185 A1* | 3/2011 | Bitan ................ | G06F 17/30864 707/706 |

OTHER PUBLICATIONS

"Working Notes of the WWW2002 Workshop on Mobile Search", by Yoelle Maarek et al., presented May 7, 2002, available at http://www.haifa.il.ibm.com/Workshops/www2002-MobileSearch/index.html, 49 pages.

"WWW2002 Workshop on Mobile Search", by Aya Soffer et al., presented May 7, 2002, available at http://www.haifa.il.ibm.com/Workshops/www2002-MobileSearch/index.html, 4 pages.

"The PageRank Citation Ranking: Bringing Order to the Web", by Larry Page et al., available at http://citeseer.ist.psu.edu/rd/14181455%2C368196%2C1%2C0.25%2CDownload/http%3AqSqqSqwww-db.stanford.eduqSq%7EbackrubqSqpageranksub.ps, Jan. 29, 1998, 17 pages.

* cited by examiner

MOBILE TO NON-MOBILE DOCUMENT CORRELATION

CROSS-REFERENCE TO RELATED APPLICATIONS

This application claims the benefit of the priority of U.S. patent application Ser. No. 11/153,237, filed Jun. 15, 2005, entitled "Mobile to Non-Mobile Document Correlation", the disclosure of which is incorporated by reference in its entirety.

TECHNICAL FIELD

This disclosure relates to ranking or scoring of particular electronic documents, such as those produced in response to a search request to a search engine.

BACKGROUND

The public has now come to understand that "search" is a key part of using the Internet effectively. More importantly, accurate search allows people to access information they need (the "wheat") without providing them lots of things they do not need (the "chaff"). As the amount of information available to most individuals, whether on a local desktop or on the Internet, increases each year, the need for effective search becomes even more important.

Search for typical Internet content has advanced very far, as exemplified by the Google PageRank system. This system provides search results in the form of a ranked list of results, where the most relevant results are displayed at the top of the list. The system depends in part on the relationships between various web pages so that pages that are referenced by other pages get a higher ranking, and pages referenced by other pages having a high ranking get an even higher ranking.

Search is also an important part of mobile data communication, such as that by cellular telephone. For example, users of mobile devices have all the needs of users at desktop computers and also have needs for particular types of searches, such as for restaurants, hotels, and various other local search options. In addition, mobile users want to receive documents or web pages that can be displayed on a mobile device. Because mobile devices may have lower resolution or smaller displays, limited memory, and relatively low bandwidth that is relatively costly, such devices may be unable to receive or display regular, non-mobile documents. One solution is to place mobile devices in a "walled garden" so that they can only access a relatively small subset of the documents on the Internet. This approach may have the desirable effect of forcing users into products and services sponsored by the telecommunication service provider, but it has the definitely undesirable effect of denying users access to documents they may want and need.

Thus, opening users up to the entire mobile web is a great benefit. However, in many ways the mobile web is not as developed as the non-mobile web, e.g., there are fewer web pages, and the pages that do exist are often in narrow areas (e.g., sponsored by major commercial sites like Amazon). In addition, mobile documents are often significantly smaller than their non-mobile counterparts, and thus may have less text or other content upon which a decision about the relevance of a document may be based. While it might seem that the smaller size of the mobile web would make search easier because there is less "chaff," it is in many ways more difficult because factors needed for proper ranking of results are not available in the less-developed mobile web. Thus, there is a need for improved search for mobile documents.

SUMMARY

In general, this document discusses systems and methods for improving responses to requests for information regarding mobile documents on a network such as the Internet. Such systems and methods identify correlations between mobile documents to be displayed on mobile devices and non-mobile documents. In providing the mobile documents in response to a request such as a search result, one or more of the mobile documents is ranking according to a ranking indicator or indicators (such as ranking scores) for its corresponding non-mobile document. Thus, the non-mobile document serves as a sort of ranking proxy where the mobile document cannot be ranked satisfactorily on its own. Other correlations or correspondences (with the terms "correspond" and "correlate" having equivalent meanings as used here) are also possible.

In one implementation, a method of determining the relevance to a user of documents accessible over a computer network is disclosed. The method comprises analyzing information relating to a first document, identifying a second document corresponding to the first document with a computer, obtaining information that indicates the relevance of the second document, and determining the relevance of the first document using the information indicating relevance of the second document. The first document may be a mobile document, while the second document may be a non-mobile document. Also, the information that indicates the relevance of the second document may comprise back link information. The information relating to the first document may also comprise a locational identifier, such as a URL, for the mobile document.

In some implementations of the method, the second document may be identified by locating a truncated form of a locational identifier for the first document, and the truncated form may include a locational path that omits a folder in the locational identifier for the first document. The second document may also be identified by identifying multiple truncated locational identifiers and testing each until a second document is identified.

In other implementations of the method, a relevance indicator may also be determined for the first document from relevance information for the second document, and the first document ranked in a result list using the relevance indicator. The first document may be ranked using the relevance indicator if the first document is determined to be substantially less popular than the second document. Also, the result list may include a search result list. The result list may also be transmitted to a mobile device.

In another implementation, a system for identifying and ranking documents is disclosed. The system may comprise a search engine to provide relevance indicators for documents, a correlating engine to identify correlations between a first document and a second document that differs from the first document, and a document ranker that supplies a relevance indicator from the second document to the first document. The correlating engine may comprise a uniform resource locator (URL) parser, and the document ranker may supply a rank for the second document to the first document if the first document has a popularity below a predetermined level. In addition, a web server may be provided for transmitting a combination of the first document and a plurality of other documents, along with a plurality of promotional items to a mobile device.

In yet another implementation, a system for identifying and ranking documents is provided. The system may comprise a search engine to identify and indicate the relevance of a document of a second type, and means for indicating the relevance of a document of a first type using information about the document of a second type. The document of a first type may be a mobile document and the document of a second type may be a non-mobile document.

In yet another implementation, a computer program product tangibly embodied in an information carrier is provided. The product may include instructions that, when executed, perform a method for classifying electronic content, where the method comprises analyzing information relating to a first document, identifying a second document corresponding to the first document using a computer, obtaining a ranking indicator for the second document, and ranking the first document in a result list using the ranking indicator for the second document. Again, the first document may be a mobile document and the second document may be a non-mobile document. Also, the information that indicates the relevance of a second document may comprise back link information The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
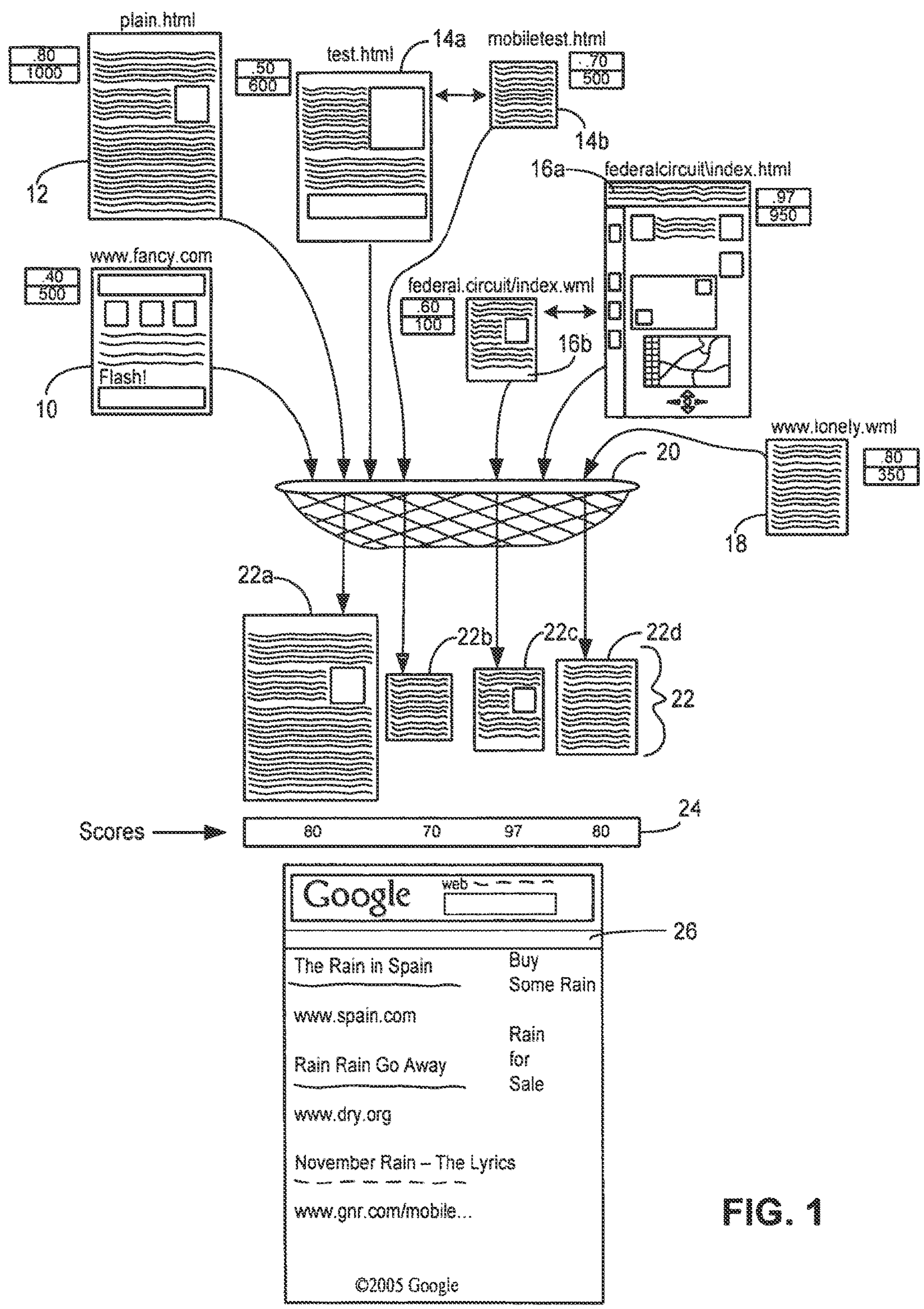
FIG. 1 is a conceptual diagram showing the filtering and scoring of mobile documents.

FIG. 1 is a conceptual diagram showing the filtering and scoring of mobile documents. In general, a universe of documents is present and includes both documents that can be displayed on particular mobile devices and those that cannot be displayed at an adequate level on particular mobile devices. The documents could include, for example, web pages on the Internet or various documents on an internal network like an intranet. In general, some documents might be displayable on more mobile devices than others. Thus, the decision of whether a document is mobile or non-mobile may depend on the context, such as the sort of device on which the document is to be displayed. A document may also be considered mobile simply by looking at explicit indications that it was intended by its author to be mobile, such as doctype declarations in the document, or file name extensions such as “wml” for mobile documents.

In some instances, a non-mobile document such as document 10 may not correlate with any mobile document. In other words, the main content of the non-mobile document will not be repeated on a simpler, easier-to-display mobile document. As an example, most web pages drafted by individuals do not have a corresponding mobile web. Document 12 is an uncorrelated non-mobile document because it has no corresponding mobile document (i.e., it is uncorrelated) and it is too complex to display on a particular mobile device or devices (i.e., it is non-mobile). The complexity of document 10 is indicated in this example by its name: fancy.html.

Document 12 is a document written by its author without any intent that it be a mobile device, but written in a manner that it can be displayed on a particular mobile device of interest. Specifically, document 12 is a simple text document with only a single simple image on it. Thus, although it is labeled as an HTML document that is generally not directed to mobile devices, it is a simple enough document that it can be treated as a mobile document. Likewise, a presumptively mobile document labeled as a WML document might not be considered a mobile document for some mobile devices that simply are unable to display the document. The simplicity of document 12 is indicated in the example by its name: plain.html.

In other instances, a non-mobile document such as document 14*a* may be correlated with a mobile document such as document 14*b*. For example, document 14*a* could be a web page (such as a page in XHTML format) for the CNN news network having numerous images and active content such as news video clips and animated banner ads. Document 14*b* could be a web page (such as a page in WML format) that contains the text of the CNN article from the non-mobile page, along with a simple image and some limited advertising. Thus, the two pages have the same substantive content—the news article. Non-mobile document 16*a* and mobile document 16*b* have a similar correlation. In the example, document 14*a* is indicated by the file name test.html, and document 14*b* by the file name mobiletest.html. Non-mobile document 16*a* is indicated by the file name federalcircuit.html, while mobile document 16*b* is indicated by the file name federalcircuit.wml.

Certain mobile documents such as document 18 may not correlate with any non-mobile documents. Document 18 is designated with the URL lonely.wml to represent such a lack of a corollary non-mobile document. In the context of display on a particular device, a mobile document may be considered as a document that is fairly displayable on that device or class of devices. In the context of identifying correlated documents, a mobile document may be considered a document that has a more complex correlating document, while the more complex version of the document may be considered a non-mobile document apart from whether or not it is displayable on a particular device.

Each document is shown next to a box containing two numbers. The top number in each box represents a ranking indicator for the document, calibrated to 1.0 as a top score. The ranking indicator corresponds to the level a document would be ranked in a search result list or other similar display with respect to other such documents. Thus, the ranking indicator may reflect the relative popularity of a document with respect to a certain term. For example, the homepage for CNN might have a ranking indicator of 1.0 for the term “CNN,” a ranking indicator of 0.8 for the term “world news,” and a ranking indicator of 0.1 for “sugarbeet museum.” The ranking of a document may also be made independent of any particular term, such that the ranking could be computed in a pre-processed manner, before a user search is started. Such a ranking may be computed in any appropriate manner, and the form of doing so is not central to the systems or methods described here. For example, a ranking indicator or indicators may be generated using a feature such as the well-known Google PageRank.

Behind any such score, each document may also be associated with a number of other documents that link to the first document. These links, known as back links, may provide an indication of the first document's popularity, and links from popular documents may indicate that the first document is particularly popular. The back links (and back links inherited from another document) can be used in a query-independent manner to compute a popularity score during preprocessing, such as with the well-known PageRank system. The back links may also be used to compute a relevancy score or indicator, or otherwise indicate relevancy, for a particular topic or search term. Such a score may be query-dependent, computed on-line or while the user is waiting for search results, and may be based at least in part on the number of back links whose anchors contain words or other items from the query. A final relevance score may also be created from a combination of the query-independent and the query-dependent scores.

The bottom number indicates the level of activity with respect to a document. This activity number is calibrated to 1000 as a top value in the example. The activity number serves as an indication of how many "samples" were used to compute the ranking indicator so as to reflect a level of certainty that the ranking indicator is accurate. For example, a particular document may have a relatively high ranking indicator because of some coincidence that does not reflect that the document actually should be ranked highly. The activity number can serve as a check to allow the system to question ranking indicator values that seem improperly high or low, and come from documents having low levels of activity.

A ranking indicator can itself be reflective of activity. For example, where a ranking is based on the number and quality of back links that connect documents, a higher number of back links creates a higher score. The number of back links also reflects a degree of activity or popularity for the document—showing that it is linked into many other sites and that its high ranking is not merely a fluke.

Filter 20 makes a determination of which documents are displayable on mobile devices and which are not. Filter 20 is provided with one or various documents, such as by a search engine crawler that has located the documents, and filter 20 in turn provides an indication of whether the documents should be considered to be displayable on particular devices, and thus flagged as either mobile or non-mobile for those devices. In doing so, filter 20 may first attempt to determine the file type for a document, e.g., HTML, XHTML, WML, etc. Such a determination may be made by looking at the file extension or by particular tags in the document. However, authors of documents do not always follow standards, so such explicit indicators may be misleading. Thus, filter 20 may also look at other document features in determining the file type of the document.

Filter 20 may then use the file type and other document features to determine whether the document is displayable on mobile devices and, if so, on what mobile devices it is displayable. Such a determination may be carried out by applying predetermined heuristic rules to the document features, such as to generate a score for the document using weighted values for each relevant document feature. The features to be considered, the scores to give them, and the weight to give them, may all be updated manually or automatically, such as by using known machine learning techniques. Also, the features may be analyzed and compared to values for similar features in a corpus of documents that have previously been classified properly. In such a case, the document could be given the classification of the standard document to which it is a closest match.

The filter may also use a simpler approach for locating mobile documents. For example, any located documents (e.g., located by a crawler) may be assumed to be mobile if they announce a mobile doctype, use a mobile file extension such as "wml," or are located in a file path having a mobile indication such as "mobile" or "imode." Various other techniques for determining whether a particular document is mobile or non-mobile may also be employed.

Filtered documents 22 are the documents determined by the filtration process to be mobile documents, at least for some mobile devices. Though shown for simplicity as a simple group, because some documents can be "mobile" for certain devices and "non-mobile" for others, the filtered documents 22 actually may be a multi-dimensional group. Specifically, each document may have an indication of the mobile devices or groups of device on which it is displayable, and it is thus a mobile document as to those devices. Documents may be classified according to a particular displayability score and may be included generally as mobile documents if they meet some threshold score (i.e., that can be displayed on a fairly broad class of devices at the high end of mobile devices). Documents may be considered mobile in general if they are displayable on a substantial number of mobile devices.

In addition to identifying which of the documents in a universe of documents is displayable on particular devices, the filtration process may also modify the documents somewhat. For example, if a document would be displayable but for the presence of a particular feature (such as a Flash animation), that feature may be removed. The feature may also be replaced with an appropriately-sized feature such as a graphic that says "an item was removed by formatting in this location." The system may look to a tag or other indication in documents before making such alterations, however, such as where an author wants a document displayed only in its 100% original form.

As shown in FIG. 1, the filtered documents 22 include document 22*a* that comes from document 12, and is a mobile document because it contains only simple text and a graphic. The filtered documents 22 also include document 22*b* that comes from document 14*b*, and is a mobile document either because it contains only simple text, it has "mobile" in its file or path name, or because it is found to correlate with a document 14*a* that is determined to be non-mobile using the same factors used to classify document 14*b*. The filtered documents 22 also include document 22*c* that comes from document 16*b*, and is a mobile document for reasons similar to those for document 22*b*. Finally, the filtered documents 22 in this example include document 22*d*, which comes from document 18, and is a mobile document because it is small and wholly text-based.

With the mobile documents identified, the system may assign those documents an indication or score such as a relevance or ranking indicator. Here, the assigned score may be based on the mobile document itself or on the corresponding non-mobile document. In particular, it may be that a mobile document is not sufficiently popular to make an accurate ranking—not because there is something wrong with the mobile document, but because there are few mobile pages and thus little mobile web traffic (and relatively little linking between mobile documents). As a result, certain mobile documents, particularly in areas that are not yet popular, may be ranked using a proxy that is not the directly-computed score for the mobile document. Instead, the score for a corresponding non-mobile document or other indicator of relevance for the non-mobile document, such as inherited back links passed from the non-mobile document to the mobile document, may be used. Also, rank or relevance as used here does not require relevance for a particular information request, but can cover other indications that are used to develop a relevant response for a user. For example, back link information that is query-independent can be an indicator of relevance even though it is computed before the system knows what the query is going to be.

In one example, the mobile document may simply inherit the links pointed toward its non-mobile counterpart, and a score for the mobile document may be computed using those links (and in some circumstances, other factors). The links may be used to compute a popularity score or to compute a PageRank. The anchor texts on the links may thus be used to calculate relevance scores between a query and various mobile documents.

Thus, for example, it could be that the original home page for the U.S. Patent & Trademark Office (PTO at www.uspto.gov), which has been around for years, has been linked to by many other pages relating to patents. At first, it would have had no such back links, but as the web site became more well-known, and authors of web sites relating to patents created links to the PTO web site as a service to their visitors, the score for the PTO web site would have increased. As a result, it will have been "voted" by those other authors to the top of the rankings for search results in general and for searches looking for "patents," based on the links they provided to the site.

Now suppose the PTO wants to serve people who are looking for information using mobile devices. Its webmaster may look at the original home page and seek to maintain the substance of that page so that users familiar with the original page can more readily use the mobile version of the page. In addition, commonality of content makes a web site easier to maintain and more helpful where the content changes regularly (e.g., with a news web site or a web blog). Thus, the webmaster may copy the text of the original site to the new mobile site, and delete or simplify more complex content, such as by removing certain images and other content.

The webmaster may form this new web page using WML, and may for simplicity of organization select the same name for the WML file as for the original HTML file. The webmaster may also produce multiple different mobile documents that correspond to non-mobile documents, and for better organization, may store the mobile document files in different directories than the non-mobile document files. In particular, the webmaster may create a mobile path to hold all mobile-related files, and a non-mobile path to hold all non-mobile documents, where the organization within each path matches. Thus, for example, two documents in the system could be: www.uspto.gov/mobile/patentsearch.wml and "www.uspto.gov/nonmobile/patentsearch.html." Other methods of differentiating and organizing such files may also be used, as explained in more detail below.

The scores 24 assigned to the mobile documents thus may be applied based on the score (or other indicator of relevance) of another document where that other score or indicator of relevance can be expected to provide a better indication of both documents' relevance than can the score of the mobile document itself. Other aspects indicative of the other document's relevance (e.g., back links) may also be used to determine the relevance of the first document. As applied to the documents in FIG. 1, document 22*a* receives a score of 80 because that was the score of the mobile document and there was no correlated non-mobile document. Document 22*b* receives a score of 70 because, although there is a corresponding non-mobile document, the mobile document itself shows activity at a level (500) almost equal to that of the non-mobile document (600). For example, the mobile web may have become almost as mature as the non-mobile web in this area so that the mobile version of the page has almost as many back links as does the non-mobile version.

Document 22*c* receives a score of 97, the score of its correlated non-mobile document. Here, the non-mobile score is used as a proxy for the mobile document's score because the activity for the mobile document (100) is much lower than that for the non-mobile document (950). Again, where a separate measure of activity is not used, such as where the score incorporates a measure of activity or popularity, the number for the non-mobile document could be used—at least until the mobile document reaches some threshold score. Finally, document 22*d* receives a score of 80 because it has no correlated document and its own score is 80.

The score that is used for a particular mobile document—whether non-mobile or mobile—can depend on the relative activity or popularity of the mobile document. For example, when a mobile document is new and unknown to others, its score will generally be low (or it's level of activity will be low). In such a situation, the score or other indicator of relevance for the corresponding non-mobile document may be looked to as the best indicator of an appropriate rank for the mobile document. As the mobile document become more known, its score may rise, and the system may ultimately use that score directly.

Where mobile scores or indicators are used for some documents (e.g., those that do not have a non-mobile counterpart) and non-mobile scores for others, the scores may require some correction. For example, a document may be very well-known among those on the mobile web, but relatively unknown when compared to another document on the non-mobile web (which is much larger and more mature). For this reason, a correction factor may be applied to the scores so as to make them more comparable and to allow accurate ranking of documents, such as in a search result list. Also, the term "score" is not intended here to require an actual number, or a number that is comparable on a common scale with other such scores. Rather, any indication that can be used to represent the rank or appropriateness of a document to a user's request can be considered as a score.

With one or more of the scores determined, documents can be presented to a user, such as in view 26—a portion of a web browser display showing search results in a standard format. The documents in such view can be ranked from highest score to lowest score or in another appropriate manner, and may be represented by, for example, a hyperlinked title, a snippet of content (e.g., text or an image), and a uniform resource locator (URL) in a conventional manner. Other content may also be inserted between results in the list or above or below the list, and the information about the ranked documents may also be presented in a form other than a list.

In addition, promotional content such as advertisements may be provided on view 26, as shown near the right edge of view 26 in FIG. 1. The promotional content may be generated in known manners, such as according to the Google AdWords system and process. The promotional content may also be selected and ranked based on scores or other indicators for corresponding promotional material intended for non-mobile devices, using the features discussed above and below. Thus, just as relevant results information may be delivered to a user employing rankings for a non-mobile document, promotional materials too may be delivered according to promotional materials that would be delivered to the non-mobile document. In certain situations, the format of the promotional materials may differ, however, between the non-mobile and mobile situations, and correlations between equivalent ads having different formats may be maintained by the system.

As described, the locating and identification of documents as being mobile is done in a pre-processing manner such as continuously as new documents are found by a crawler (or it may also be completed in batches for efficiency or other reasons). The locating and identification may also be done after a user makes a request, such that the system looks for documents that match the request rather than looking in a prepared index, and classifies the document in real time. Also, documents may be located, and a relevance score assigned, as part of pre-processing, such as using the PageRank system, and subsequent scoring may be employed (whether on the mobile documents or on the non-mobile documents followed by inheritance over to the mobile documents) after a search request is received to produce a more accurate indication of relevance.

Figure 2:
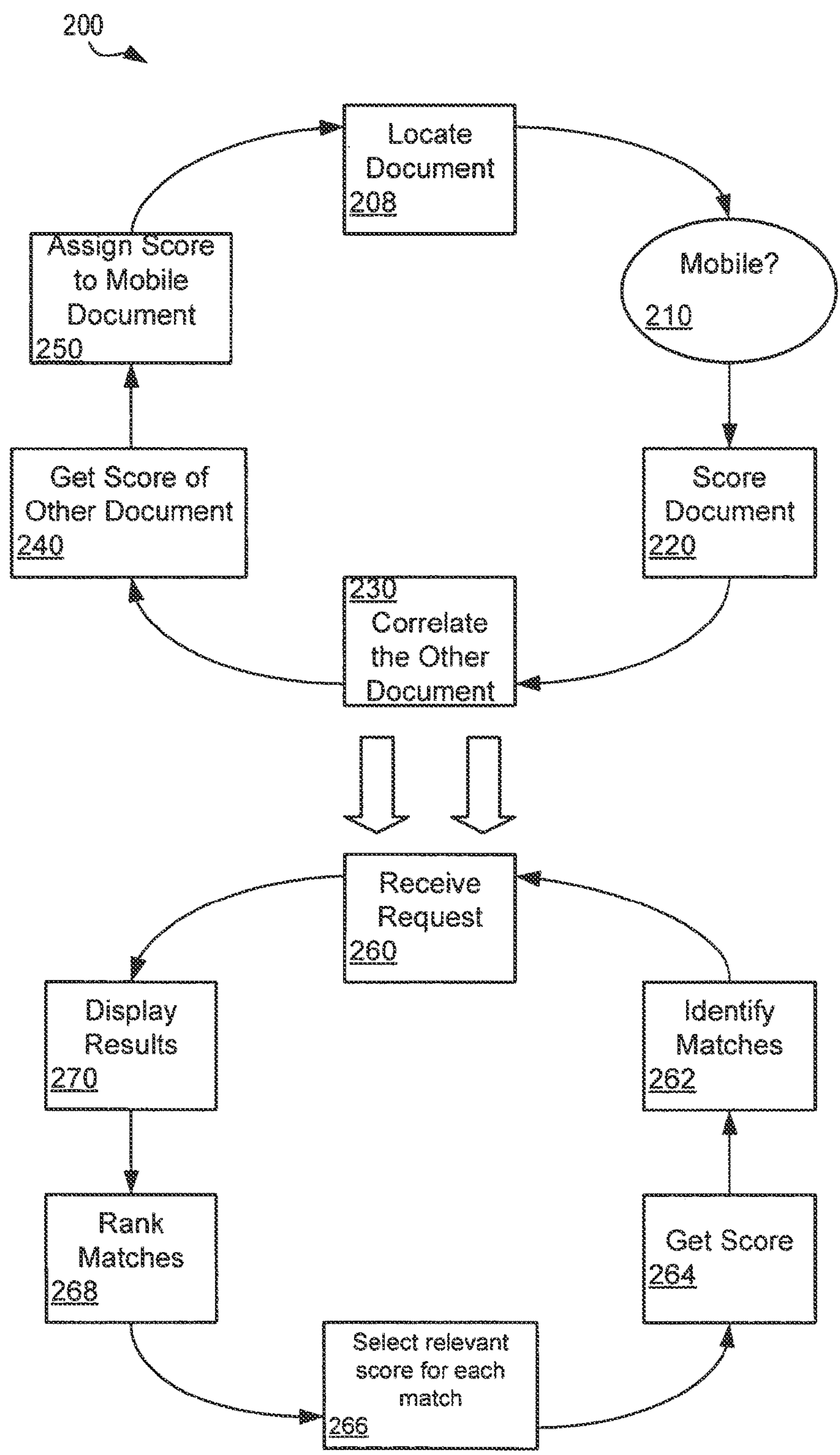
FIG. 2 is a flow diagram showing a process for ranking mobile documents.

FIG. 2 is a flow diagram showing a process 200 for ranking mobile documents. The process 200 includes an indexing phase 204 and a serving phase 206. The indexing phase 204 comprises the actions by which documents are located and scored. The serving phase 206 comprises the actions by which a request is received from a user and results are presented to the user according to their scores. The actions are shown in loops because, in general, they each occur over and over continuously. For example, a system will need to identify multiple documents, and may need to do so continuously so as to stay up-to-date as the documents change over time (e.g., using a crawler and known document locating processes). In a similar manner, requests come in from users over time, and it is best if those requests are filled using information that is up-to-date. As a result, it may be expected that both sets of processes will occur continuously or nearly continuously, and in parallel with each other.

At step 208, a document is located, such as using a crawler. The document may be analyzed to determine whether it should be classified as mobile or non-mobile (step 210), either in general or for particular devices. The document may also be analyzed for various other features and purposes, such as for standard search engine processing. If the document is not mobile, it may be handled in a standard manner and scored. If it is mobile, it may also be scored, such as by using known back link scoring across a corpus of mobile documents, and the score may be adjusted as appropriate to make it comparable to other scores.

At step 230, the document is correlated with another document—generally a non-mobile document that corresponds to the mobile document. The correlation may be performed in a variety of manners. For example, a match for the content of the identified mobile document may be searched, and if a close match is found, the other document may be assumed to be a correlating document.

A corresponding document may also be located by rewriting the document's name or path, and checking for the presence of a document at the location of the rewritten name or path. For example, where certain mobile keywords appear in a path, they can be removed, e.g., trading "/" for "/mobile/", "/imode", "/i/", or "/index.wml." Other transformations may include "http://" or "http"//www." for "http:/wap." As one example, a mobile document found at "http://www.google.co.jp/imode/" could have a corresponding non-mobile document searched out at "http://www.google.co.jp/". As another example, a document found at "http://wap.bbc.co.uk/" could have a corresponding non-mobile document searched out at "http://bbc.co.uk" and "http://www.bbc.co.uk".

Note that one mobile document may have multiple corresponding non-mobile documents. In such a situation, the features or score to be applied to the mobile document may be determined in a number of appropriate manners. For example, a comparison of the content in the mobile document may be made with the non-mobile documents, and the parameters for the non-mobile document having the closest match may be used. Also, the average score of the two non-mobile documents or the back links for both non-mobile documents may be used.

A corresponding document may also be located by identifying a document at the same domain as the mobile document, and having the same root name as the mobile document, but with a different file name extension. For example, if the mobile document is called "index.wml," the domain for the document could be searched for a document named "index.html" or "index.htm" or "index.xhtml."

A corresponding document may also be located by parsing of the mobile document name. For example, if the document is named "mobile_index.wml," the domain for the mobile document may be search for a document named "index.html." Other common designations for mobile documents may also be determined and stored, and may be parsed out of the names of identified mobile documents in looking for a corresponding non-mobile document.

A corresponding document may also be located by analyzing the tree in which the mobile document is stored. For example, where a mobile document has been found at "www.uspto.gov/mobile/document.wml," the domain many be searched at "www.uspto.gov/document.html." Other heuristics may also be used in searching for corresponding documents, and may, for example, follow conventions that are determined to be common for the naming and organizing of files, such as in the example of the webmaster above.

The correspondence between two documents may also be determined based in part on the person who authored the documents, with the assumption that two corresponding documents will often having the same author. Alternatively, documents from the same organization may be correlated.

Correlation between documents may also be determined from links between documents. For example, if a non-mobile document has a link to a mobile document, one might be able to presume that the two correspond (i.e., the non-mobile document is telling people where to get their mobile content). The same may be true if a mobile document contains a link to a non-mobile document.

HTTP re-directs may also indicate a correlation between two documents. For example, if a crawler that is pretending to be a mobile device accesses a non-mobile document and receives a signal redirecting it to another document, it may be presumed that the second document is mobile.

Correlations may also be established from non-mobile to mobile, in ways similar to that just described. For example, in building up a group of mobile documents in a system that already has indexed a large number of non-mobile documents, the system may step through the non-mobile documents, and search for corresponding mobile documents at the same domains using the techniques above or other appropriate techniques. Such a situation may occur, for example, where a corresponding mobile and non-mobile document are published to the web simultaneously, and a crawler comes across the mobile document first.

Also, DNS/IP addresses may be used to locate corresponding documents on different servers. For example, if btogo.com has a DNS server that is nsl.bloomberg.com, then such a connection suggests that btogo.com is affiliated with bloomberg.com. Using such information, a system may search all such affiliated sources of documents for matching documents. In addition, once one set of documents is found to correlate to each other, a system may more efficiently locate other such correlated documents by exploiting parallels. For instance, if a correlated document is located on a bloomberg server for a document on a btogo server, the system may then look first to the bloomberg server for other correlated documents for the btogo server. In addition, the system may look in similar paths, whether on the same server or different servers, once it has found correlated documents between those paths. Also, when new documents are added to a server, the system may use locational relationships that it has learned from prior documents in an attempt to find new correlated documents.

When a corresponding document is located by methods that do not depend on the content of the document, the correlation may be checked by computing the level of similarity of the content between the mobile document and what has been identified as a corresponding non-mobile document. If there is a close enough match, the non-mobile document may be confirmed as a corresponding document and entries representing the correlation may be added to a database so that the correlation may be used later. If there is not a close enough match, other methods for locating a correlating/corresponding document may be attempted, and if all attempts fail, the mobile document can be considered by the system to have no correlated document, and an appropriate entry made in the database.

Once a correlation is made between a mobile document and a non-mobile document, the score or another indicator of relevance for the non-mobile document may be obtained for later use as a proxy for the score or other indicator of relevance of the mobile document (step 240). The score may be contained, for example, in a database representing documents that have been indexed in a system, and may simply be copied over to a database (or a portion of the original database) representing mobile documents that have been indexed. Alternatively, a pointer or other appropriate structure may be provided, where information relating to the mobile document is stored that points to the non-mobile document. Thus, when the score of the mobile document is sought, the seeker may be redirected to get that score or other relevant relevance information from the storage location relating to the non-mobile document. In this manner, if information about relevance of the non-mobile document is updated (and it is common to update such scores), the mobile document's correlated information will also be updated by extension.

At step 250, a score is assigned to the mobile document. Such assignment may simply involves establishing a pointer to the non-mobile document. It may also involve determining an actual score for the mobile document (such as by back link analysis) and determining whether that score is sufficiently representative of the relevance of the mobile document. If it is (e.g., if the score is high enough), it may be used, and if it is not, the corresponding non-mobile score may be used. The assigning of a score may also involve assignment of other information, such as by having the mobile document inherit back links or other indicators from the non-mobile document. As already mentioned, this classification and scoring process may be ongoing as new documents are identified.

As mentioned, serving phase 206 involves the reception and filling of information requests, such as search requests. At step 260, a request is received, and at step 262 matches are identified, which may occur by any appropriate process. Scores for the identified matching documents are obtained at step 264, such as by conducting a simple database look-up on pre-scored documents. If a score for each mobile document has not already been selected (e.g., as between the score for a mobile document and its non-mobile counterpart), as described above, the relevant score may then be selected, as shown at step 266. Also, additional relevance computation may occur, such as by using information generated in indexing phase 204, and providing a more complete relevance or ranking score using information from the request. With the documents scored, they may then be ranked (step 268) and the results transmitted to a mobile device for display (270). When another request is received, the process may be repeated.

Figure 3:
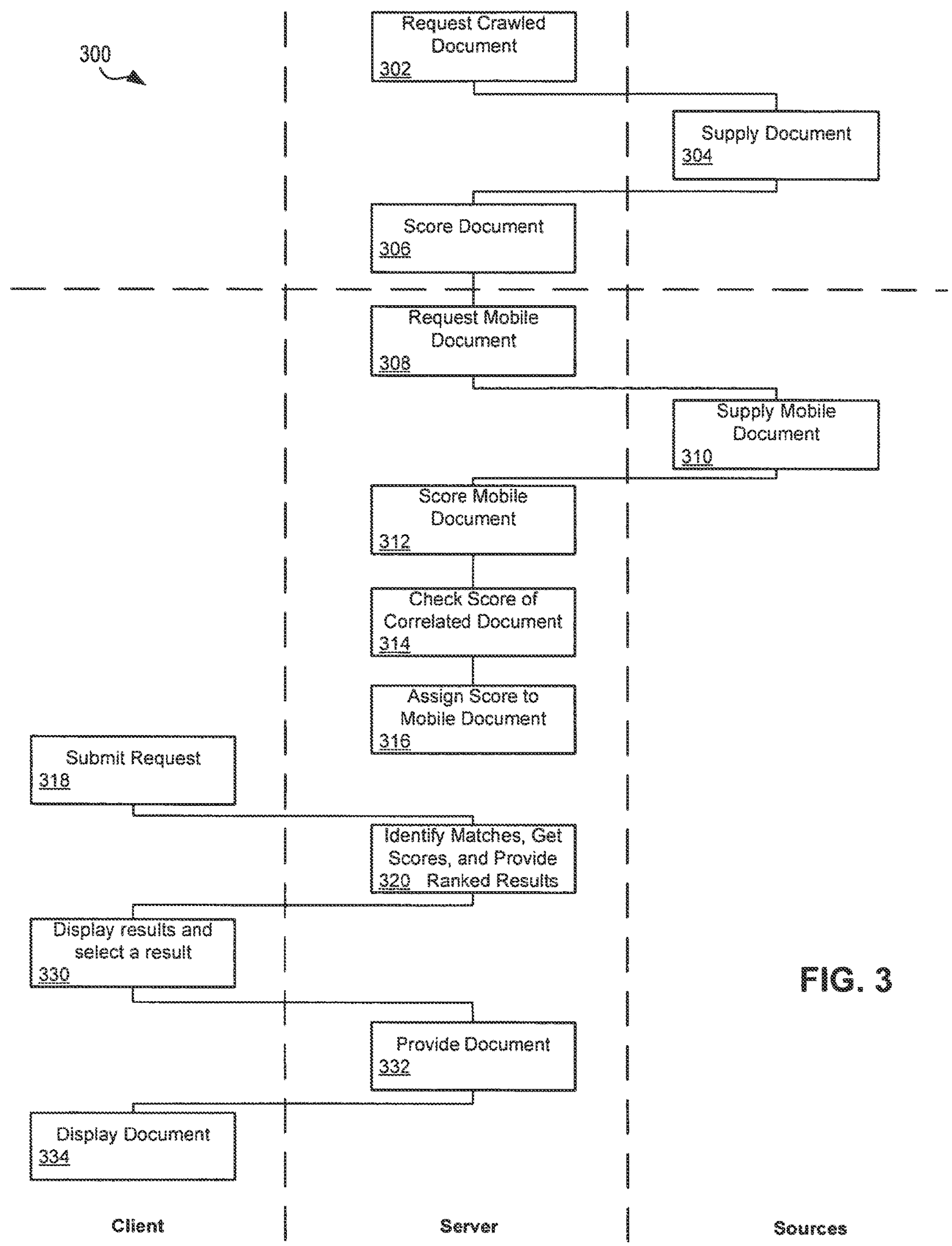
FIG. 3 is a flow diagram showing a process carried out by a server, a client, and information sources.

FIG. 3 is a flow diagram showing a process 300 carried out by a server, a client, and information sources. The flow diagram provides a view of the process based upon the components in a system—client, server, and document sources—operating on the process. At step 302, the server (which may be a number of components and distinct computers) is crawling for new documents and requests a document from a source, such as by an http request. The source supplies the document at step 304, and the server scores that document at step 306 according to known techniques.

The server then requests another document, such as a mobile document, at step 308, which may be the mobile document that corresponds to the document previously obtained and scored. Of course, upon requesting the mobile document, the server may not yet know that it is mobile. The source then supplies the mobile document at step 310, and the server scores the mobile document. The server may then identify the document that corresponds or correlates to the mobile document, such as by the approaches discussed above, and may obtain the score of any identified corresponding document (step 314). The server at step 316 than assigns a score to the mobile document. At this point, the server will have obtained, indexed, and scored a number of various documents and will be ready to receive requests for the documents.

At step 318, a user submits a request for information such as in the form of a search request. In response, the server identifies matches for the request, gets scores for he documents that match, and provides or transmits the results for the request ranked in accordance with the scores. When the mobile device receives the results, it display them to the user, and the user may select one of the results such as by selecting a hyperlinked title for the document on the display of the device (step 330). That selection may be returned to the server (such as when the user requests a cached copy of the document) or to another server (such as when the user requests the current document), which server may then transmit the document back (step 332) for display on the mobile device (step 334).

The designation of a particular component as a client, server, or source in FIG. 3 is not intended to limit those items to a formal client-server architecture or otherwise limit their implementation. Rather, the terms are simply intended to represent a device or system receiving information and a device or system supplying the information. Thus, a system may be a client in some situations and a server in others.

Figure 4:
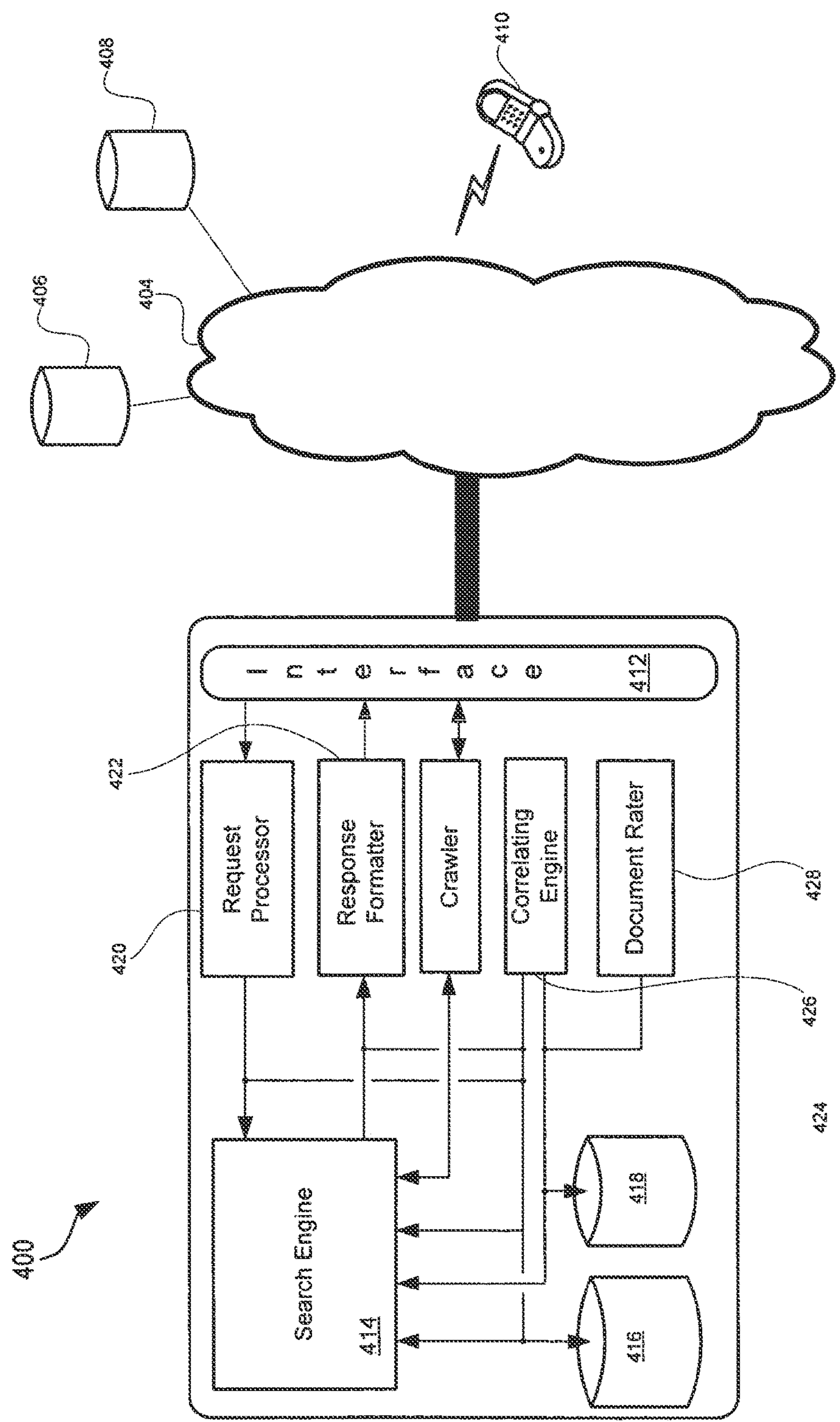
FIG. 4 is a diagram of a system for organizing and ranking various forms of documents.

FIG. 4 is a diagram of a system 400 for organizing and ranking various forms of documents. The system may include a server 402, which is represented conceptually as a single machine, but could be a number of servers, such as servers for searching and for crawling information, and web servers for receiving requests and formatting responses to those requests. The servers may be connected and configured in any appropriate manner, and the particular arrangement is not critical to the methods and apparatuses described herein.

Server 402 is connected to network 404, such as the internet. In this manner, server 402 may communicate as needed with other devices connected for communication through the network 404. For example, servers 406, 408 may also be connected to the network and may include sources of document that server 402 may crawl in attempting to index information on the network 404. Also, mobile device 410 may also be connected for communication through the network 404, such as by a wireless network that is in turned connected to the network 404. Through these connections, server 402 may send and receive all necessary information, including by receiving requests from users and sending responses to those requests.

Server 402 includes an interface 412 through which it communicates with network 402 and other devices (not shown). Requests pass through interface 412 and are provided to request processor 420, which may parse the requests and route them to the appropriate component of server 402. In a similar manner response formatter receives information from components within server 402 and formats them, such as rendering them with a mark-up language, for transmission to the network 402. The request processor 420 and response formatter 422 may be distinct components, as shown, or there may be multiple such components within and as part of other portions of server 402. The particular implementation is not critical.

One central component of server 402 is search engine 414, which may include the various levels of functionality needed to generate search results in response to search requests. The search engine may be fed by crawler 424, which may use various approaches to scanning resources on network 404. Crawler 424 may pass on what it locates to search engine 414, so that search engine may catalogue, index, and rank the located documents.

Index database 416 may also be provided for storage of the index and other information about documents referenced by search engine 414. Operational storage 418 may hold other information needed by server 402, such as other databases, computer applications, and parameters for operation of search engine 414.

A correlating engine 426 may also be provided to analyze documents that have been located by crawler 424 and/or indexed by search engine 414. As described in more detail above, correlating engine 426 may serve to identify documents that are a match, in that they share substantial amounts of content. Specifically, the correlating engine 426 may be configured to identify matches if all of the substantive text of two documents is the same, and the only difference is graphical material, advertisements, or other differences that do not go to the substance of the document. Such pages may be assumed to be the same in the minds of users such that the relative popularity of one on the non-mobile net can be assumed to be the same as the relative popularity of the other on the mobile net.

The correlating engine may be provided with features that allow it to parse file names and paths, and to search domains or the index database 416 for corresponding files. It may also be provided with content matching capability so as to determined a degree-of-similarity between the content of two documents. Such a comparison may be conducted to determine in the first instance whether two documents correlate with each other, or as a check to ensure that two documents having correlated names or location also have similar or the same content.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, steps in the exemplary processes may be performed in other orders, or by other devices, and steps may be added or deleted. Accordingly, other embodiments are within the scope of the following claims.

What is claimed is:

1. A computer-implemented method, comprising:

identifying, by the computing system, a first document;

identifying, by the computing system, a second document that comprises content that is different from the first document;

determining, by the computing system, a level of similarity between substantive content of the first document and substantive content of the second document;

assigning, by the computing system, a similarity score to a relationship between the first document and the second document based on the determined level of similarity between the substantive content of the first document and the substantive content of the second document;

receiving, by a computing system, a query that was defined by user input at a computing device;

identifying, by the computing system, documents that are responsive to the received query, wherein the documents that are responsive to the received query comprise the first document;

determining, by the computing system, that the similarity score for the relationship between the first document and the second document satisfies a predetermined level of similarity;

identifying, by the computing system, information that reflects a relevance score assigned to the second document as a result for one or more queries;

assigning, by the computing system based on having determined that the similarity score for the relationship between the first document and the second document satisfies the predetermined level of similarity, a relevance score to the first document that is based on the relevance score that is assigned to the second document;

ranking, by the computing system and in response to having received the query, each of the documents that are responsive to the received query using relevance scores that have been assigned to the documents that are responsive to the received query, to generate a ranking of the documents that are responsive to the received query, wherein the documents that are responsive to the received query includes the first document and the ranking of the relevance scores uses the relevance score that was assigned to the first document based on the relevance score assigned to the second document; and providing, by the computing system and in response to having received the query, information for receipt by the computing device so as to cause the computing device to present a display of search results that identify the documents that are responsive to the received query and that are presented in an order that is defined by the ranking, wherein the display of search results includes a search result that identifies the first document.

2. The computer-implemented method of claim 1, wherein determining, by the computing system, a level of similarity between substantive content of the first document and substantive content of the second document further comprises determining, by the computing system, that the first document corresponds to the second document by determining that content of the first document corresponds to content of the second document.

3. The computer-implemented method of claim 1, further comprising:

determining, by the computing system, that the first document corresponds to the second document by determining that a request over the internet by a computer for the second document redirects to the first document.

4. The computer-implemented method of claim 1, wherein determining, by the computing system, a level of similarity between substantive content of the first document and substantive content of the second document further comprises:

(i) determining that the second document has been created for display on a non-mobile device; and (ii) determining that the first document is a version of the second document that is different than the second document and that has been created for display on a mobile device.

5. The computer-implemented method of claim 1, wherein the information that reflects the relevance score assigned to the second document as the result for the one or more queries is a second relevance score that reflects a ranking of the second document as a result for the received query.

6. The computer-implemented method of claim 5, wherein the second relevance score reflects a popularity of the second document with respect to a certain term that is included in the received query.

7. The computer-implemented method of claim 1, wherein assigning the score to the first document that is based on the relevance score that is assigned to the second document includes determining the relevance score to assign to the first document based on a number of links to the second document that are found in various other documents.

8. The computer-implemented method of claim 1, wherein assigning the score to the first document that is based on the relevance score that is assigned to the second document includes weighting the use of the information that reflects the relevance score of the second document based on a number of user selections of the first document in response to the first document being presented as a result to queries, such that the information that reflects the relevance score of the second document is used less as the number of user selections of the first document increases.

9. The computer-implemented method of claim 1, further comprising determining that the first document and the second document have substantially the same substantive content.

10. The computer-implemented method of claim 4, wherein determining that the second document has been created for display on a non-mobile device comprises determining that the second document has a file name extension of “html” or “htm”, and wherein determining that the first document is a version of the second document that is different than the second document and that has been created for display on a mobile device comprises determining that the second document has a file name extension of “wml”.

11. The computer-implemented method of claim 4, wherein determining that the first document is a version of the second document that is different than the second document and that has been created for display on a mobile device comprises determining that the second document is located in a file path having a predetermined mobile indication.

12. A computer-readable storage device including instructions that, when executed by a processor, cause performance of operations that comprise:

identifying, by the computing system, a first document;

identifying, by the computing system, a second document that comprises content that is different from the first document;

determining, by the computing system, a level of similarity between substantive content of the first document and substantive content of the second document;

assigning, by the computing system, a similarity score to a relationship between the first document and the second document based on the determined level of similarity between the substantive content of the first document and the substantive content of the second document;

receiving, by a computing system, a query that was defined by user input at a computing device;

identifying, by the computing system, documents that are responsive to the received query, wherein the documents that are responsive to the received query comprise the first document;

determining, by the computing system, that the similarity score for the relationship between the first document and the second document satisfies a predetermined level of similarity;

identifying, by the computing system, information that reflects a relevance score assigned to the second document as a result for one or more queries;

assigning, by the computing system based on having determined that the similarity score for the relationship between the first document and the second document satisfies the predetermined level of similarity, a relevance score to the first document that is based on the relevance score that is assigned to the second document;

ranking, by the computing system and in response to having received the query, each of the documents that are responsive to the received query using relevance scores that have been assigned to the documents that are responsive to the received query, including the score that was assigned to the first document based on the score that is assigned to the second document, to generate a ranking of the documents that are responsive to the received query, wherein the documents that are responsive to the received query includes the first document and the ranking of the relevance scores uses the relevance score that was assigned to the first document based on the relevance score assigned to the second document; and providing, by the computing system and in response to having received the query, information for receipt by the computing device so as to cause the computing device to present a display of search results that identify the documents that are responsive to the received query and that are presented in an order that is defined by the ranking, wherein the display of search results includes a search result that identifies the first document.

13. The computer-readable storage device of claim 12, wherein determining, by the computing system, a level of similarity between substantive content of the first document and substantive content of the second document further comprises determining, by the computing system, that the first document corresponds to the second document by determining that content of the first document corresponds to content of the second document.

14. The computer-readable storage device of claim 12, wherein the operations further comprise:

determining, by the computing system, that the first document corresponds to the second document by determining that a request over the internet by a computer for the second document redirects to the first document.

15. The computer-readable storage device of claim 12, wherein determining, by the computing system, a level of similarity between substantive content of the first document and substantive content of the second document further comprises:

(i) determining that the another document has been created for display on a non-mobile device; and (ii) determining that the first document is a version of the second document that is different than the second document and that has been created for display on a mobile device.

16. The computer-readable storage device of claim 12, wherein the information that reflects the relevance score assigned to the second document as the result for the one or more queries is a relevance score that reflects a ranking of the second document as a result for the received query.

17. The computer-readable storage device of claim 16, wherein the second relevance score reflects a popularity of the second document with respect to a certain term that is included in the received query.

18. The computer-readable storage device of claim 12, wherein assigning the score to the first document that is based on the relevance score that is assigned to the second document includes determining the relevance score to assign to the first document based on a number of links to the second document that are found in various other documents.

19. The computer-readable storage device of claim 12, wherein assigning the score to the first document that is based on the relevance score that is assigned to the second document includes weighting the use of the information that reflects the relevance score of the second document based on a number of user selections of the first document in response to the first document being presented as a result to queries, such that the information that reflects the relevance score of the second document is used less as the number of user selections of the first document increases.

20. A system for identifying and ranking documents, comprising:

a search engine configured to receive a query that was defined by user input at a computing device;

a correlating engine configured to perform operations comprising:

identifying, by the computing system, a first document;

identifying, by the computing system, a second document that comprises content that is different from the first document;

determining, by the computing system, a level of similarity between substantive content of the first document and substantive content of the second document;

assigning, by the computing system, a similarity score to a relationship between the first document and the second document based on the determined level of similarity between the substantive content of the first document and the substantive content of the second document;

identifying documents that are responsive to the received query, wherein the documents that are responsive to the received query comprise the first document;

determining that a similarity score for the relationship between the first document and the second document satisfies a predetermined level of similarity;

identifying information that reflects a relevance score assigned to the second document as a result for one or more queries; and assigning, based on having determined that the similarity score for the relationship between the first document and the second document satisfies the predetermined level of similarity, a relevance score to the first document that is based on the relevance score that is assigned to the second document; and a document ranker configured to perform operations comprising:

ranking, in response to having received the query, each of the documents that are responsive to the received query using relevance scores that have been assigned to the documents that are responsive to the received query, including the score that was assigned to the first document based on the score that is assigned to the second document, to generate a ranking of the documents that are responsive to the received query, wherein the documents that are responsive to the received query includes the first document and the ranking of the relevance scores uses the relevance score that was assigned to the first document based on the relevance score assigned to the second document; and providing, in response to having received the query, information for receipt by the computing device so as to cause the computing device to present a display of search results that identify the documents that are responsive to the received query and that are presented in an order that is defined by the ranking, wherein the display of search results includes a search result that identifies the first document.

21. The system of 20, wherein the information that reflects the relevance score assigned to the second document as the result for the one or more queries is a second relevance score that reflects a ranking of the second document as a result for the received query.

22. The system of claim 21, wherein the second relevance score reflects a popularity of the second document with respect to a certain term that is included in the received query.

23. The system of claim 20, wherein assigning the relevance score to the first document based on the relevance score that is assigned to the second document includes determining the relevance score to assign to the first document based on a number of links to the second document that are found in various other documents.

* * * * *

UNITED STATES PATENT AND TRADEMARK OFFICE

CERTIFICATE OF CORRECTION

PATENT NO. : 10,474,685 B1
APPLICATION NO. : 14/621613
DATED : November 12, 2019
INVENTOR(S) : Gomes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this
Twenty-first Day of July, 2020

Andrei Iancu
*Director of the United States Patent and Trademark Office*